US005241658A

United States Patent [19]

Masterson et al.

[11] Patent Number: 5,241,658

[45] Date of Patent: Aug. 31, 1993

[54] APPARATUS FOR STORING INFORMATION IN AND DERIVING INFORMATION FROM A FRAME BUFFER

[75] Inventors: Anthony Masterson, Saratoga; William Dawson, Sunnyvale; Spencer Worley, Santa Clara, all of Calif.

[73] Assignee: Apple Computer, Inc., Cupertino, Calif.

[21] Appl. No.: 570,391

[22] Filed: Aug. 21, 1990

[51] Int. Cl.[5] .............................................. G06F 15/20

[52] U.S. Cl. .................................... 395/162; 395/131; 395/164; 340/701; 340/703; 340/799

[58] Field of Search ............... 395/131, 162, 164, 166; 340/701, 703, 798-800

[56] References Cited

U.S. PATENT DOCUMENTS 4,821,208 4/1989 Ryan et al. .......................... 340/799
5,128,658 7/1992 Pappas et al. ....................... 340/703
5,130,701 7/1992 White et al. ........................ 340/701

FOREIGN PATENT DOCUMENTS 93954 11/1983 European Pat. Off. ............ 395/131

*Primary Examiner*—Dale M. Shaw
*Assistant Examiner*—Kee M. Tung
*Attorney, Agent, or Firm*—Blakely, Sokoloff, Taylor & Zafman

[57] ABSTRACT

An arrangement for storing information to be displayed in a plurality of different pixel formats on a bitmapped output display including apparatus for selecting first positions for storage of information in a first pixel format, apparatus for selecting second positions for storage of information in a second pixel format, apparatus for selecting information from first positions of storage for display in the first pixel format, and apparatus for selecting information from second positions of storage for display in the second pixel format.

6 Claims, 3 Drawing Sheets

PROCESSOR FORMATS

BIT ADDRESSES

| | | | | | | | | | | | | | | | |
|---|---|---|---|---|---|---|---|---|---|---|---|---|---|---|---|
| 127:120 | 119:112 | 111:104 | 103:96 | 95:88 | 87:80 | 79:72 | 71:64 | 63:56 | 55:48 | 47:40 | 39:32 | 31:24 | 23:16 | 15:8 | 7:0 |

24 BIT/PIXEL PROCESSOR FORMAT

| | | | | | | | | | | | | | | | |
|---|---|---|---|---|---|---|---|---|---|---|---|---|---|---|---|
| X | $R_0$ | $G_0$ | $B_0$ | X | $R_1$ | $G_1$ | $B_1$ | X | $R_2$ | $G_2$ | $B_2$ | X | $R_3$ | $G_3$ | $B_3$ |

X = UNUSED

8 BIT/PIXEL PROCESSOR FORMAT

| | | | | | | | | | | | | | | | |
|---|---|---|---|---|---|---|---|---|---|---|---|---|---|---|---|
| $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |

FIG. 4

APPARATUS FOR STORING INFORMATION IN AND DERIVING INFORMATION FROM A FRAME BUFFER

BACKGROUND OF THE INVENTION

1. Field of the Invention

This invention relates to computer circuitry and, more particularly, to apparatus for storing information of different formats in and deriving that information from a frame buffer.

2. History of the Prior Art

Information to be presented on a bitmapped computer output display may appear in many different formats. For example, each pixel on the display may appear in black and white, in color, or as a shade of gray. In order to represent black and white, only a single bit of digital information is required. Color is typically represented by either eight or twenty-four bits of digital information at each pixel. If it is desired to present approximately one-half million twenty-four bit color pixels on an output display as occurs with screens displaying approximately 800 by 600 pixels, then it is necessary that a frame buffer have storage for one and one-half megabytes of digital information (three bytes per pixel). Such a frame buffer would also be capable of storing over a million pixels of eight bit color information if the information is directed to the proper storage positions. However, a typical frame buffer does not have circuitry for directing the digital information to storage which correctly represents the two different formats of information.

SUMMARY OF THE INVENTION

It is, therefore, an object of the present invention to provide circuitry for storing information in and deriving information from a frame buffer using a plurality of different pixel formats.

It is another more specific object of the present invention to provide circuitry for storing information in and deriving information from a frame buffer using both eight bit and twenty-four bit color pixel formats.

These and other objects of the present invention are realized in an arrangement for storing information to be displayed in a plurality of different pixel formats on a bitmapped output display comprising means for selecting first positions for storage of information in a first pixel format, means for selecting second positions for storage of information in a second pixel format, means for selecting information from first positions of storage for display in the first pixel format, and means for selecting information from second positions of storage for display in the second pixel format.

These and other objects and features of the invention will be better understood by reference to the detailed description which follows taken together with the drawings in which like elements are referred to by like designations throughout the several views.

BRIEF DESCRIPTION OF THE DRAWINGS

FIG. 4 is an illustration of bit addresses and processor formats utilized in the circuitry of the invention.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
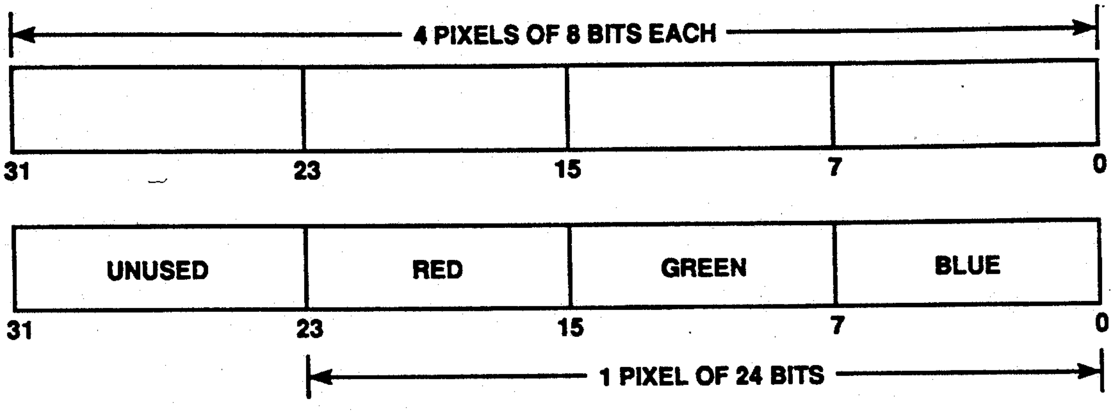
FIG. 1 is an illustration of the two formats in which a pixel may be utilized by the circuitry of the invention.

Referring now to FIG. 1, there are illustrated the arrangements of bits utilized in representing color information in eight bit format and twenty-four bit format. The upper illustration in FIG. 1 shows one word which includes thirty-two bits of digital information representing four individual eight bit (one byte) color pixels arranged adjacent one another in bit positions from 0 to 31. The lower illustration in FIG. 1 shows one word which includes thirty-two bits of digital information representing a single twenty-four bit color pixel with bits representing red, green, and blue each arranged in eight bit groups spanning bits 0 through 23 and bits 24 through 31 being unused.

In a typical computer architecture, the central processing unit transfers information on a bus to a frame buffer to be displayed on an output display. The frame buffer typically comprises video random access memory. In a exemplary embodiment, the data path from the central processing unit is sixty-four bits wide, and information is transferred to the frame buffer by the central processing unit sixty-four bits (two words) at a time.

In order to utilize all of the frame buffer storage space, when twenty-four bit color information is written to a frame buffer, the unused byte of information in each thirty-two bit word must be discarded. This may be accomplished by writing the unused byte to a frame buffer address which does not exist. In this manner, all of the space in the frame buffer is used for the twenty-four bit color pixel information. However, when the same frame buffer is used to store information in which color information is coded in both twenty-four and eight bit formats, a major problem occurs. If the frame buffer is constructed to receive information so that it utilizes all of its space in storing the twenty-four bit format but does not store the unused byte in each word, then it will address every fourth byte of the eight bit information to addresses which do not exist. Consequently, it cannot be used in this manner. Instead, the typical frame buffer simply wastes the storage space on the unused byte in the twenty-four bit color mode so that positions exist for all four bytes of eight bit color information when that format is used. Consequently, since the typical computer has no way of modifying the positions of the frame buffer in which the different formats are stored, the typical frame buffer cannot take full advantage of the storage space available.

Figure 2:
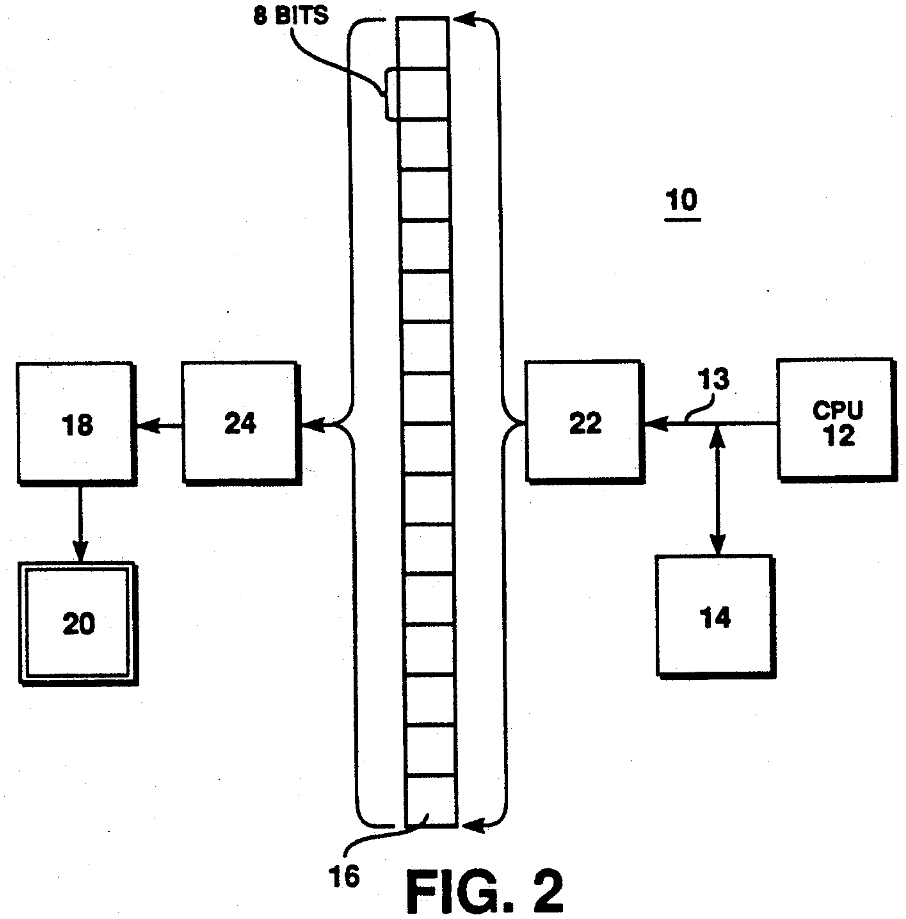
FIG. 2 is a block diagram illustrating the circuitry of the present invention.

FIG. 2 illustrates a block diagram of an arrangement 10 in accordance with the present invention adapted to make full use of the storage space available in a frame buffer in twenty-four bit color pixel mode yet allow the storage of eight bit color pixel information as well. In the arrangement 10, a central processing unit 12 is arranged to furnish information on a data path 13 to various components of a computer system including random access memory 14. In the arrangement 10, a sixty-four bit data path 13 is presumed. Information which is to be displayed is presented to a frame buffer 16, only a single line of which is illustrated. Information derived from the frame buffer 16 is transferred by a color-look-up-table/digital-to-analog converter (CLUT/DAC) 18 to an output display 20 for presentation. The CLUT/DAC 18, the display 20 and the frame buffer are constructed in a manner well known to the prior art and for that reason are not further described.

In contrast to prior art systems, the arrangement 10 also includes input circuitry 22 which both widens the data path for addressing the frame buffer 16 and provides the means by which a plurality of different pixel formats may be utilized most economically in the same frame buffer. Also included in the arrangement 10 is output circuitry 24 which cooperates with the input circuitry 22 to derive the information stored in different formats in the frame buffer 16 in proper form for transfer to the CLUT/DAC 18 for display by the display 20.

Figure 3:
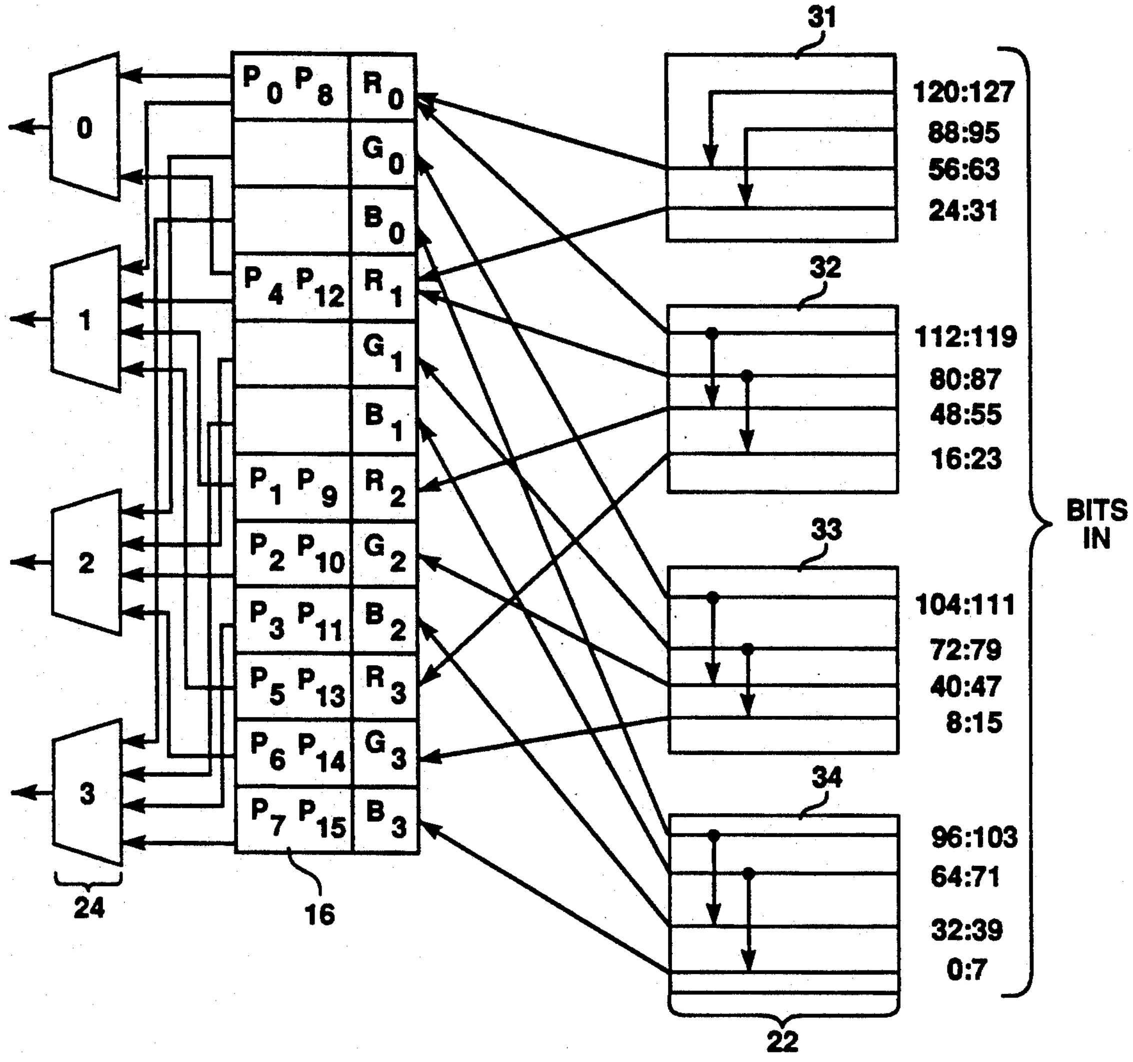
FIG. 3 is a block diagram illustrating a specific embodiment of the invention.

FIG. 3 illustrates in detail the elements of a preferred embodiment of the input circuitry 22 and the output circuitry 24 to store the pixel information in and derive it from the frame buffer 16. The input circuitry 22 is a gate array which includes four data path chips 31–34 which are used to accomplish the wide path addressing of the frame buffer 16. In the preferred embodiment, information in twenty-four bit pixel format is provided to input circuitry 22 in first and second groups (words) each of sixty-four bits. This 128 bits of information is written at one time into the frame buffer 16 in order to obtain a frame buffer input bandwidth which is twice the sixty-four bit bandwidth of the data bus. This allows four pixels of twenty-four bit color information to be written to the frame buffer at one time.

In the eight bit pixel mode, four times as many pixels are present on the bus as in the twenty-four bit color mode. Consequently, it is unnecessary to write 128 bits at a time in order to obtain sufficient bandwidth. This makes it unnecessary to delay the writing into the frame buffer until 128 bits are present; each sixty-four bits present on the bus are simply directed to the frame buffer. Consequently, from the viewpoint of the processor, the data path appears to be 128 bits wide in twenty-four bit pixel mode and sixty-four bits wide in eight bit pixel mode. To the processor, the frame buffer 16 appears to include a megabyte and a half of 128 bit wide thirty-two bits per pixel memory while it actually includes only a megabyte of ninety-six bit wide twenty-four bit per pixel memory. To the processor, the frame buffer 16 appears to be a megabyte of sixty-four bit wide, eight bit per pixel memory. The gate array of the input circuitry 22 effectively rearranges the data lines from the input to the output in the different modes in order to allow the different pixel formats to be stored and retrieved.

The bit addresses and processor formats discussed above are illustrated in FIG. 4 in order to assist in understanding. In twenty-four bit mode of operation, the 128 bits of input information are directed to the input terminals in the manner illustrated to the right of the data path chips 31–34. 128 bits represent four pixels numbered 0–3 of twenty-four bit color information. In twenty-four bit mode, the ninety-six bits of actual color information at the 128 input terminals are directed by the data path chips 31–34 to the frame buffer as follows. On input terminals [0:7] are furnished the eight bits of blue information for pixel three which are stored in the frame buffer positions labelled blue three (B3). On input terminals [8:15] are furnished the eight bits of green information for pixel three which are stored in the frame buffer positions labelled green three (G3). On input terminals [16:23] are furnished the eight bits of red information for pixel three which are stored in the frame buffer positions labelled red three (R3). On input terminals [32:39] are furnished the eight bits of blue information for pixel two which are stored in the frame buffer positions labelled blue two (B2). On input terminals [40:47] are furnished the eight bits of green information for pixel two which are stored in the frame buffer positions labelled green two (G2). On input terminals [48:55] are furnished the eight bits of red information for pixel two which are stored in the frame buffer positions labelled red two (R2). On input terminals [64:71] are furnished the eight bits of blue information for pixel one which are stored in the frame buffer positions labelled blue one (B1). On input terminals [72:79] are furnished the eight bits of green information for pixel one which are stored in the frame buffer positions labelled green one (G1). On input terminals [80:87] are furnished the eight bits of red information for pixel one which are stored in the frame buffer positions labelled red one (R1). On input terminals [96:103] are furnished the eight bits of blue information for pixel zero which are stored in the frame buffer positions labelled blue zero (B0). On input terminals [104:111] are furnished the eight bits of green information for pixel zero which are stored in the frame buffer positions labelled green zero (G0). On input terminals [112:119] are furnished the eight bits of red information for pixel zero which are stored in the frame buffer positions labelled red zero (R0).

On input terminals [24:31] are furnished the eight bits of black information for pixel three which are stored in no frame buffer positions. On input terminals [56:63] are furnished the eight bits of blank information for pixel two which are stored in no frame buffer positions. On input terminals [88:96] are furnished the eight bits of blank information for pixel one which are stored in no frame buffer positions. On input terminals [120:127] are furnished the eight bits of blank information for pixel zero which are stored in no frame buffer positions. This is accomplished by the gating circuitry within the data path chip 31. The circuitry therein is essentially a gate array constructed in a manner well known to the prior art. In the twenty-four bit mode, the multiplexors of the array are controlled so that no connections are made to the frame buffer 16 from the chip 31.

Thus in twenty-four bit mode, it will be seen that the information in the unused bytes of the twenty-four bit format is addressed to the data path chip 31 from which no connections are made to the frame buffer 16 for this mode of operation. The actual storage positions of the frame buffer 16 which are addressed may lie adjacent one another in the manner shown (in the right-hand column) so that there is no space wasted in the frame buffer 16.

In the eight bit mode of operation, the sixty-four bits of input information are directed to the input terminals in the manner illustrated to the right of the data path chips 31-34. In transferring the same 128 bits of data the information is furnished in two sixty-four bit wide transfers each of which transfers eight bytes of eight bit color information to the frame buffer 16. The first sixty-four bits appear on input terminals [0:63]; the second sixty-four bits appear on input terminals [64:127]. The bits of information furnished in the second sixty-four bits on the input terminals [64:127] are switched in the eight bit mode by the multiplexors of the gate array circuitry internal to the data path chips 31-34 so that they appear to the frame buffer 16 as though originally present on the same input terminals [0:63] as the first sixty-four bits.

In eight bit mode, the bits of information are directed by the data path chips 31-34 to the frame buffer as follows. On the first sixty-four bit transfer of eight bit information, input terminals [0:7] are furnished the eight bits of information for pixel seven which are stored in the frame buffer positions labelled pixel seven (P7. The input terminals [8:15] are furnished the eight bits of information for pixel six which are stored in the frame buffer positions labelled pixel six (P6). On input terminals [16:23] are furnished the eight bits of information for pixel five which are stored in the frame buffer positions labelled pixel five (P5). On input terminals [24:31] are furnished the eight bits of information for pixel four which are stored in the frame buffer positions labelled pixel four (P4). On input terminals [32:39] are furnished the eight bits of information for pixel three which are stored in the frame buffer positions labelled pixel three (P3). On input terminals [40:47] are furnished the eight bits of information for pixel two which are stored in the frame buffer positions labelled pixel two (P2). On input terminals [48:55] are furnished the eight bits of information for pixel one which are stored in the frame buffer positions labelled pixel one (P1). On input terminals [56:63] are furnished the eight bits of information for pixel zero which are stored in the frame buffer positions labelled pixel zero (P0).

On a second transfer of sixty-four bits, input terminals [64:71] are furnished the eight bits of information for pixel fifteen. These are switched to input terminals [0:7] within the chip 34 and are stored in the frame buffer positions labelled pixel fifteen (P15). The input terminals [72:79] are furnished the eight bits of information for pixel fourteen. These are switched to input terminals [8:15] within the chip 33 and are stored in the frame buffer positions labelled pixel fourteen (P14). On input terminals [80:87] are furnished the eight bits of information for pixel thirteen. These are switched to input terminals [16:23] within the chip 32 and are stored in the frame buffer positions labelled pixel thirteen (P13). On input terminals [88:95] are furnished the eight bits of information for pixel twelve. These are switched to input terminals [24:31] within the chip 31 and are stored in the frame buffer positions labelled pixel twelve (P12). On input terminals [96:103] are furnished the eight bits of information for pixel eleven. These are switched to input terminals [32:39] within the chip 34 and are stored in the frame buffer positions labelled pixel eleven (P11). On input terminals [104:111] are furnished the eight bits of information for pixel ten. These are switched to input terminals [40:47] within the chip 33 and are stored in the frame buffer positions labelled pixel ten (P10). On input terminals [112:119] are furnished the eight bits of information for pixel nine. These are switched to input terminals [48:55] within the chip 32 and are stored in the frame buffer positions labelled pixel nine (P9). On input terminals [120:127] are furnished the eight bits of information for pixel eight. These are switched to input terminals [56:63] within the chip 31 and are stored in the frame buffer positions labelled pixel eight (P8).

In a preferred embodiment, during the eight bit mode of operation, the information appearing on the same input lines in the first sixty-four bit transfer (eight byte positions) is placed into the frame buffer 16 in eight byte storage positions, and the information in the next sixty-four bit transfer (eight byte positions) is placed into the frame buffer 16 in eight adjacent byte storage positions in the next line of the frame buffer 16.

Thus, in the eight bit mode of operation, the data path chip 31 furnishes the eight bit information to the positions of the frame buffer 16 for storage in contrast to the operation in the twenty-four bit mode in which the meaningless data in the blank positions is simply lost because no connections are made through the chip 31.

Thus, it may be seen that the information furnished to the data path chips 31-34 is furnished in the standard bus positions for that data yet is stored in significantly different positions within the frame buffer. It may also be seen that the storage of information in the most space critical mode, the twenty-four bit per pixel mode makes complete use of the space available in the frame buffer without wasting any space on the unused byte in each pixel of twenty-four bit color information.

In order to retrieve the information from the frame buffer 16 in the two different pixel formats, a series on four output multiplexors 41-44 are utilized in the gate array of the output circuitry 24. The information is handled in increments of thirty-two bits in either mode. Thus, the output circuitry 24 derives at one time four eight bit pixels or one twenty-four bit pixel from storage positions in the frame buffer 16. The multiplexors 42-44 are four-to-one multiplexors while the multiplexor 41 is a single two-to-one multiplexor. The first multiplexor 41 receives inputs from the byte positions which store P0/P8 and P4/P12 in the eight bit mode of operation. The second multiplexor 42 receives inputs from the byte positions which store P1/P9 and P5/P13 in the eight bit mode of operation. These are the same positions storing R2 and R3 in twenty-four bit mode. The second multiplexor 42 also receives inputs from the byte positions which store R1 and R0. In like manner, the third multiplexor 43 receives inputs from the byte positions which store P2/P10 and P6/P14 in the eight bit mode of operation. These are positions storing G2 and G3 in twenty-four bit mode. The third multiplexor 43 also receives inputs from the byte positions which store G1 and G0. Similarly, the fourth multiplexor 44 receives inputs from the byte positions which store P3/P11 and P7/P15 in the eight bit mode of operation. These are positions storing B2 and B3 in twenty-four bit mode. The fourth multiplexor 44 also receives inputs from the byte positions which store B1 and B0.

Thus, the multiplexor 42 is able to select one byte of red from four available bytes R0–R3. The multiplexor 43 is able to select one byte of green from four available bytes G0–G3. The multiplexor 44 is able to select one byte of blue from four available bytes B0–B3. In this manner, the three multiplexors 42–44 together are able to select one byte each of red, green, or blue information to form a complete pixel in the twenty-four bit mode. The four multiplexors 41–44 are also able to select any four adjacent eight bit pixels (0/1/2/3, 4/5/6/7, 8/9/10/11, 12/13/14/15) in eight bits mode.

Thus, the arrangement of the present invention functions to allow the storage of both eight and twenty-four bit pixel formats in the same frame buffer and their retrieval therefrom while utilizing all of the space in the frame buffer in the most critical mode, the twenty-four bit mode of operation.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An arrangement for storing information in a frame buffer, wherein the information is to be displayed in both (1) a twenty-four bit color pixel format and (2) an eight bit pixel format on a bitmapped output display, comprising:

means for selecting first positions for storage of information in the twenty-four bit color pixel format, wherein the means for selecting first positions for storage of information in the twenty-four bit color pixel format comprises (i) gate array means for transferring color-indicating bits of each pixel to the first positions;

(ii) means for controlling the gate array means to transfer the color-indicating bits of each pixel to the first positions; and (iii) means for discarding information which does not designate color in pixels of the twenty-four bit color pixel format, wherein the means for discarding information which does not designate color in the pixels of the twenty-four bit color pixel format comprises means for controlling the gate array means to preclude transfer of bits which do not designate color in the pixels of the twenty-four bit color pixel format;

means for selecting second positions for storage of information in the eight bit pixel format;

means for selecting information from the first positions of storage for display in the twenty-four bit color pixel format; and means for selecting information from second positions of storage for display in the eight bit pixel format.

2. An arrangement for storing information in a frame buffer as claimed in claim 1 in which the means for selecting second positions for storage of information in the eight bit pixel format comprises means for controlling the gate array means to transfer data in the eight bit pixel format to the second positions.

3. An arrangement for storing information in a frame buffer as claimed in claim 2 in which the means for controlling the gate array means to transfer data in the eight bit pixel format to the second positions comprises means for transferring succeeding groups of eight bytes to the same input terminals of the frame buffer.

4. An arrangement for storing information in a frame buffer, wherein the frame buffer can accept ninety-six bits at once, wherein the information is to be displayed in one of (1) a twenty-four bit color pixel format and (2) an eight bit pixel format on a bitmapped output display, wherein the arrangement comprises:

means for selecting first positions for storage of information in the twenty-four bit color pixel format, wherein the means for selecting first positions for storage of information in the twenty-four bit color pixel format comprises (i) gate array means for transferring color-indicating bits of each pixel to the first positions;

(ii) means for controlling the gate array means to transfer the color-indicating bits of each pixel to the first positions; and (iii) means for discarding information which does not designate color in pixels of the twenty-four bit color pixel format, wherein the means for discarding information which does not designate color in the pixels of the twenty-four bit color pixel format comprises means for controlling the gate array means to preclude transfer of bits which do not designate color in the pixels of the twenty-four bit color pixel format;

means for selecting second positions for storage of information in the eight bit pixel format;

means for selecting information from the first positions of storage for display in the twenty-four bit color pixel format; and means for selecting information from the second positions of storage for display in the eight bit pixel format.

5. An arrangement for storing information in a frame buffer as claimed in claim 4 in which the means for selecting second positions for storage of information in the eight bit pixel format comprises means for controlling the gate array means to transfer data in the eight bit pixel format to the second positions.

6. An arrangement for storing information in a frame buffer as claimed in claim 5 in which the means for controlling the gate array means to transfer data in the eight bit pixel format to the second positions comprises means for transferring succeeding groups of eight bytes to the same input terminals of the frame buffer.

* * * * *